US005684628A

United States Patent [19]
Gerhard

[11] Patent Number: 5,684,628
[45] Date of Patent: Nov. 4, 1997

[54] ORTHOGONAL MOTION MICROSCOPE STAGE

[75] Inventor: Gregory J. Gerhard, Seattle, Wash.

[73] Assignee: Applied Precision, Inc., Issaquah, Wash.

[21] Appl. No.: 389,154

[22] Filed: Feb. 15, 1995

[51] Int. Cl.[6] .......................... G02B 21/26; G02B 21/00
[52] U.S. Cl. .......................... 359/391; 359/392; 359/393; 359/384
[58] Field of Search .................................. 359/391, 392, 359/393, 368, 384, 382

[56] References Cited

U.S. PATENT DOCUMENTS 4,367,915  1/1983  Georges ............................... 359/392
4,711,537  12/1987 Schindl et al. ......................... 359/392

Primary Examiner—Paul M. Dzierzynski
Assistant Examiner—Audrey Chang
Attorney, Agent, or Firm—Richardson & Folise

[57] ABSTRACT

An orthogonal motion stage provides Z axis motion, along an optical axis independently of translational motion in an orthogonal, X-Y axis reference plane. Conversely, motion in the X-Y reference plane does not induce unwanted motion in the Z axis. Straight line mechanisms interconnect the Z axis carrier to a base plate. Flexible connections are used in the straight line mechanisms to ensure accurate orthogonal motion.

20 Claims, 6 Drawing Sheets

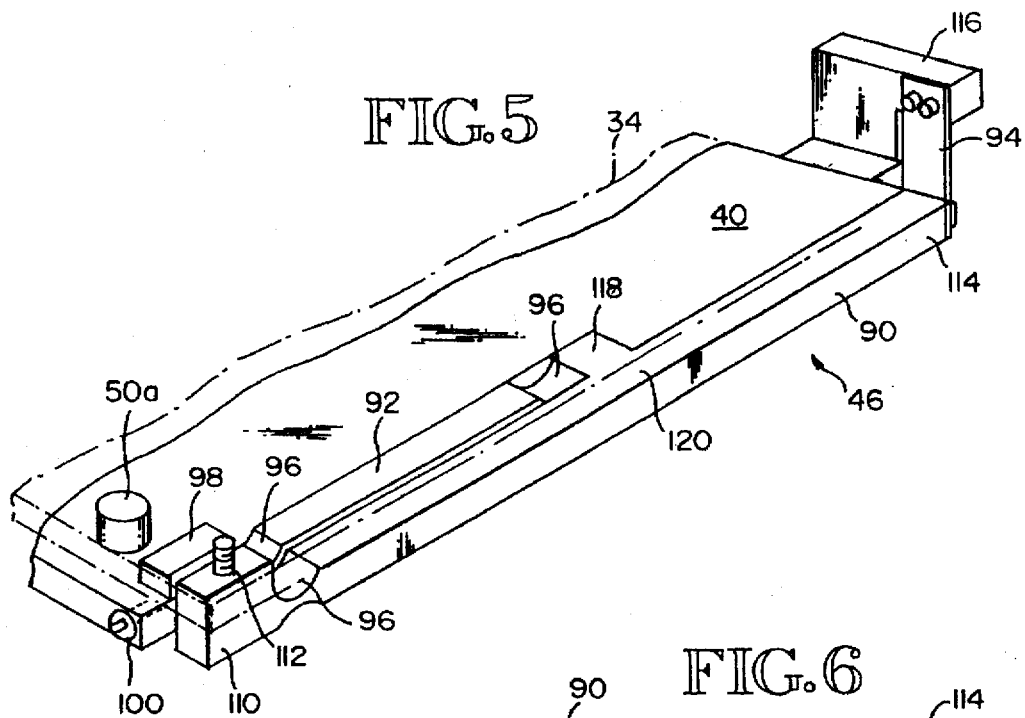
FIG. 5
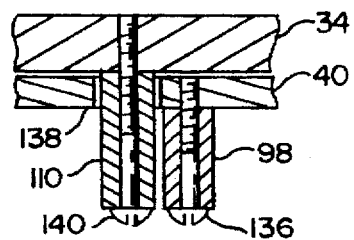
FIG. 7
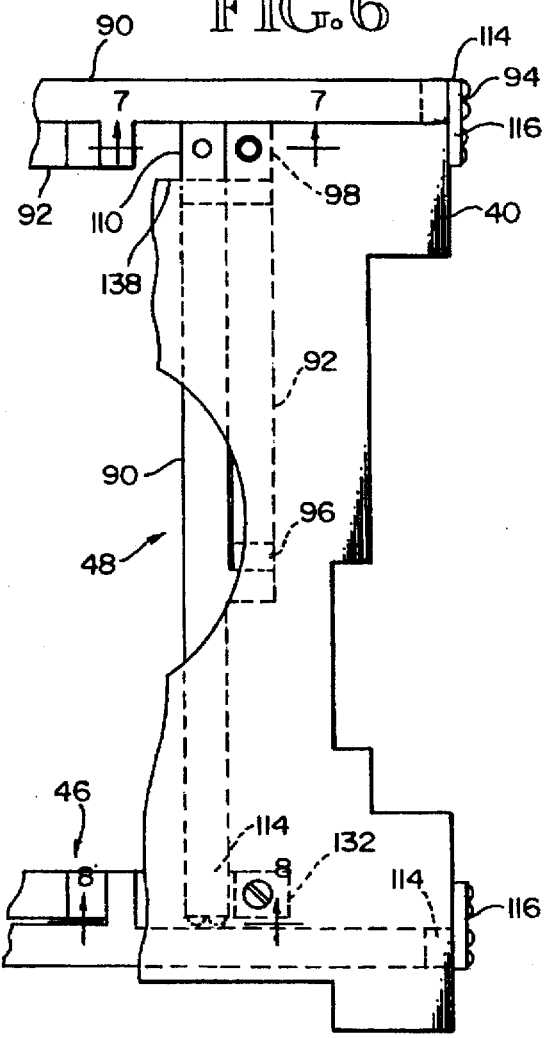
FIG. 6
FIG. 8

ORTHOGONAL MOTION MICROSCOPE STAGE

TECHNICAL FIELD

The invention relates to orthogonal motion stages. More specifically, the invention relates to independent X, Y, and Z axis stages for optical microscopes.

BACKGROUND OF THE INVENTION

Conventional confocal microscopes employ small aperture objective lenses to improve depth of field at high magnifications. As a result, confocal microscopes require high intensity light sources to provide sufficient specimen illumination for viewing or electronic imaging. Inorganic and some organic specimens can generally tolerate exposure to such high intensity light sources. However, many organic and most active biological samples cannot tolerate prolonged exposure to high intensity light sources. For this reason, modern researchers, particularly in the biotechnology field, have welcomed the introduction of wide field, optical sectioning microscopes employing wide aperture lenses. Due to the greater light gathering ability of these optics, active biological samples can be viewed for prolonged periods. In some systems, such as those offered for sale by the assignee of the present invention under the brand name DeltaVision™, it is now possible to collect optical information from wide field optics electronically, such as in a charged coupled device array, digitize and integrate that information over time and provide a computer generated three dimensional image of the sample. Such measurement techniques are particularly valuable in the field of florescence microscopy where images of the specimen are not only integrated over time, but wavelength as well.

Due to the unique nature of wide field microscopy, precise movement of the specimen along the optical axis, as well in a plane perpendicular to the optical axis (hereinafter "reference plane") is critical for the development of an accurate three dimensional image of the sample. The ability to move the sample in the reference plane, without inducing undesired motion along the optical axis is of special importance to maintain the sample in focus, as well as for the development of an accurate three dimensional representation.

Historically confocal microscope have not been burdened with the challenges of developing a three dimensional image of the specimen. Thus, movement of the specimen in the X and Y direction (i.e., the reference plane) does not present a problem even if undesirable and motion in the Z axis (i.e., the optical axis) is induced. The microscope operator merely refocuses the image. Thus, microscope stages employing confocal technology typically employ independent frames or carriers which are moveable in the X, Y and Z axis directions by manually operated, micrometer type devices. Such devices are not suitable for adaptation to computer control where a pre-established scanning pattern is imposed on the specimen to develop the desired three dimensional image.

A need therefore exists for an orthogonal motion microscope stage which is capable of moving a specimen in the X-Y reference plane without inducing motion in a perpendicular axis. A need also exists for the converse. The motion of the carriers or frames is preferably automatic and adapted to computer control.

SUMMARY OF THE INVENTION

It is therefore an object of the present invention to provide an orthogonal motion stage for moving a specimen in a referenced plane, without inducing undesirable motion of the specimen along an optical axis of a microscope.

It is also an object of the present invention to achieve the converse of the above object.

It is yet another object of the invention to achieve the above objects in an orthogonal motion stage which is adapted for automatic operation under computer control.

The invention achieves these objects, and other objects and advantages which will become apparent from the description which follows, by providing three carriers or frames which are interconnected for relative, orthogonal sliding motion in a reference plane. Two of the carriers or frames define a horizontal motion assembly while the third carrier or frame is provided for motion along an axis orthogonal to the reference frame and parallel to the optical axis of a microscope. A straight line motion mechanism connects the third carrier to a base member rigidly in directions parallel to the reference plane, and flexibly in the third direction parallel to the optical axis. A specimen carrier or the like is rigidly connected to the horizontal motion assembly in directions parallel to the reference frame, and is flexibly connected to the horizontal motion assembly in the direction of the optical axis. Thus, translational motion of the third carrier in the direction of the optical axis can be transferred to the specimen carrier without inducing motion in the reference plane, and vis-a-versa.

In a preferred embodiment of the invention, computer controlled prime movers are attached to the first, second, and third frames or carriers, for motion in their respective directions under electronic and/or computer control. Multiple straight line mechanisms inter-connect the third carrier or frame with a base member which is fixed to the microscope. The straight line mechanisms allow motion of the third carrier in a Z axis direction, but rigidly connect the third carrier with the base member in directions parallel to an X-Y axis reference plane. Each straight line mechanism has major and minor arms. Each major arm has one end connected to the third carrier, while a middle portion of the major arm is connected to one end of the minor arm. The other end of the minor arm is connected to the base member. The arms, and the connections, are rigid in directions parallel to the reference plane, and flexible in the direction of the Z axis. A third, flexible arm connects the remaining end of each major reaction arm to the base member and is oriented parallel to the Z axis. Each third arm is flexible in at least one direction parallel to the reference plane and is rigid in the remaining orthogonal directions. The resulting structure rigidly maintains the X-Y position of the third carrier or frame while permitting straight line motion of the third carrier or frame in the Z axis over a limited distance. A specimen carrier for carrying the specimen or sample to be observed by the microscope is flexibly connected to the horizontal motion assembly in the Z direction and rests upon the third carrier for translation of Z axis motion. However, the flexible connection between the specimen carrier and the horizontal motion assembly is rigid in directions parallel to the reference plane.

BRIEF DESCRIPTION OF THE DRAWINGS

FIG. 5 is an isometric view of a straight line motion mechanism of the orthogonal motion stage.

FIG. 6 is a partial, top plan view with portions cut away of the stage illustrating a rear straight line mechanism of the orthogonal motion stage.

FIG. 7 is an enlarged, partial elevational view taken along line 7—7 of FIG. 6.

FIG. 8 is an enlarged, partial sectional view taken along line 8—8 of FIG. 6.

BEST MODE FOR CARRYING OUT THE INVENTION

Figure 2:
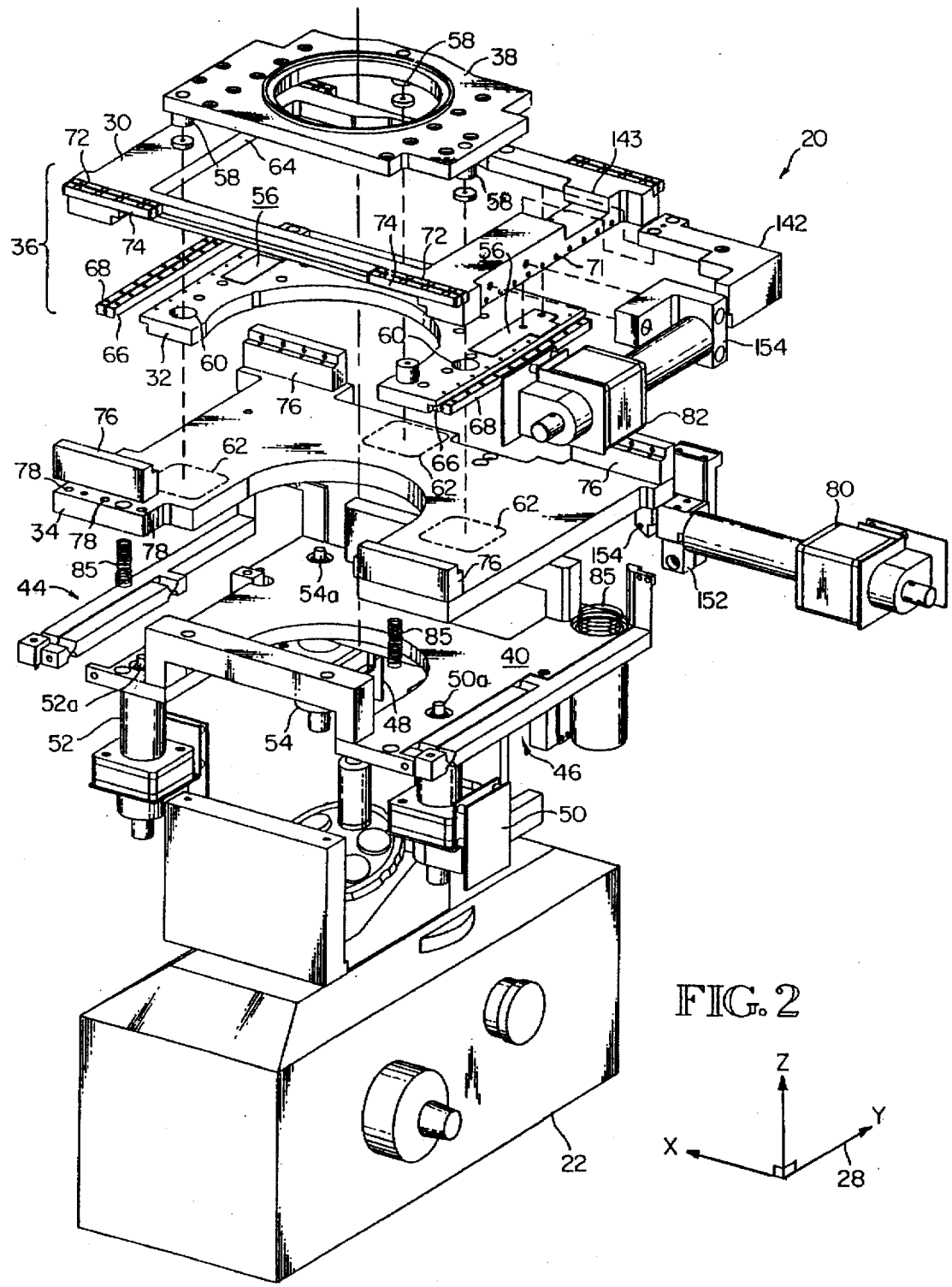
FIG. 2 is an exploded, isometric, view of the orthogonal motion stage of FIG. 1.

An orthogonal motion microscope stage, in accordance with the principles of the invention is schematically and generally indicated at reference numeral 20 in FIG. 2. FIG. 2 is an exploded isometric view illustrating the major components of the invention. Incorporation of the elements of FIG. 2, with those of the remaining figures provides a complete disclosure of the best mode contemplated by the inventor for carrying out the invention.

OVERVIEW

The invention is provided for use with a wide field, optical sectioning microscope 22 which provides low intensity illumination for biologically active samples. When used in conjunction with the microscope stage 20 of the present invention, along with conventional digital imaging and signal processing techniques, a three dimensional, time domain and optical frequency domain image of a biologically active specimen can be obtained. To achieve this result, precise precisioning of a specimen (not shown) along an optical axis 24 of the microscope 22 is required. In addition, movement of the specimen along X, Y, and Z axes represented by coordinate axes 28 is required. Specifically, movement of the specimen in the X-Y plane (hereinafter "reference plane") without inducing undesirable motion along the Z axis (i.e. in a direction parallel to the optical axis 24) and vis-a-versa is highly desirable.

The stage 20 is therefore provided with independently moveable X axis carrier or frame 30, Y axis carrier or frame 32, and Z axis carrier or frame 34. As will be described in greater detail hereinbelow, the X and Y axes frames are slidably interconnected for motion in a first orthogonal direction (e.g. the Y axis) and, the X axis frame 30 is slidably interconnected with the Z axis frame 34 for motion in a second orthogonal direction (e.g. X axis direction) so that the X axis frame 30 and the Y axis frame 32 together form a horizontal motion assembly 36.

DETAILED DESCRIPTION OF THE PREFERRED EMBODIMENTS

A specimen carrier 38 rests on the Z axis carrier 34 and is flexibly connected to the horizontal motion assembly 36 as will be described in further detail hereinbelow. The carrier is free to slide with the horizontal motion assembly 36 in the X-Y reference plane but is flexibly connected to the horizontal motion assembly in the Z direction so that only motion of the Z axis frame 34 is imparted to the specimen carrier. The Z axis carrier 34 is connected to a base plate 40 by left, right and rear (see FIG. 3) straight line mechanisms 44, 46, and 48. The straight line mechanisms flexibly connect the Z axis frame 34 for translational motion in the Z direction (and thus the specimen carrier 38) over a limited distance while rigidly maintaining the position of the Z axis carrier in the X-Y reference plane regardless of movement of the horizontal motion assembly 36 in the reference plane. Thus, the specimen carrier 38 is free to slide on the Z axis frame 34 with the horizontal motion assembly but only receives translational motion in the Z direction from the Z axis frame. Z axis motion is imparted to the Z axis frame 34 by three Z axis prime movers 50, 52, and 54.

The specimen carrier 38 is flexibly connected to the Y axis frame 32 in the Z axis direction, and rigidly in the X-Y reference plane by two flexible tabs 56. The tabs are connected at one end to the Y axis frame such as by screws (not shown). The remaining free ends of the tabs are bonded (such as by epoxy) to the underside of the Y axis frame. The tabs are manufactured from stainless steel shim stock having a thickness of 0.020 inch. The frames and base plate are preferably manufactured from 3/8 inch aluminum stock, cut and milled to the shapes shown in the figures. The specimen carrier 38 is preferably manufactured from stainless steel and has three downwardly depending legs 58 which pass through enlarged diameter apertures 60 (only two are visible in FIG. 2) defined by the Y axis carrier 32. The apertures 60 provide a clearance of about 1.6 mm in the X and Y directions so that the legs 58 ride atop highly polished areas identified at reference numerals 62 on the Z axis frame 34 without contacting the Y axis carrier 32. The specimen carrier 38 resides in an opening 64 defined by internal edges of the X axis frame 30. The specimen carrier 38, Y axis frame 32, Z axis frame 34 and base plate 40 have cut away portions which accomodate an optical path along the optical axis 24 for the microscope 22.

Figure 9:
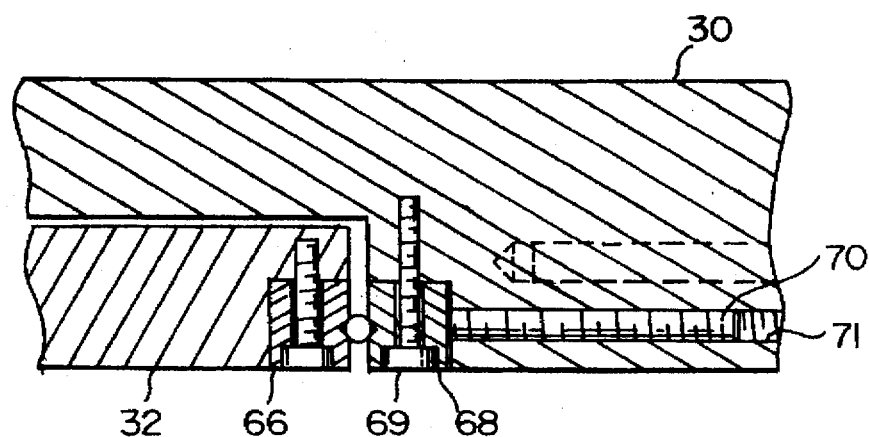
FIG. 9 is an enlarged, sectional elevational view of a bearing pre-loading device of FIG. 2.

The Y axis frame 32 has two sets of linear bearings each having an inner race 66 and an outer race 68. Appropriate bearings are available from Schneeburger, Inc. 7 DeAngelo, Bedford, Mass. 01730. The inner races are connected to the Y axis frame 32 such as by screws. As best seen in FIG. 9, the outer races 68 are connected, such as by screws 69 to the underside of X axis frame 30. The screws 69 pass through oversized bores in the right hand outer race 68 so that laterally directed set screws 70 received in bores 71 can move the outer race inwardly. Thus, by tightening the set screws 70, the Y axis bearings comprising inner and outer races 66 and 68 can be "pre-loaded" to a desired degree. A pre-load of approximately 4.3 pounds per linear inch is preferred.

The X axis frame 30 carries bearings oriented along the X axis direction having inner races 72 and outer races 74. Unlike the outer races 68 of the Y axis frame 32, the outer races 74 are not continuous but are connected, such as by screws to stanchions 76, which in turn are connected to the Z axis frame 34. The stanchions 76 are connected to Z axis frame 34, such as by screws through oversized apertures 78 allowing the outer races 74 to be pressed inwardly against the inner races 72 to pre-load the balls within the bearings whereupon the screws in the oversized aperture 78 can be tightened to maintain the pre-load. In this way, clearance within the bearings is minimized without binding the bearings thus ensuring reliable straight line operation of the bearings. As described further hereinbelow, translational motion of the X and Y axis frame 30, 32 is achieved by X axis prime mover 80 and Y axis prime mover 82.

The Z axis prime movers 50, 52, and 54 are connected to the base plate 40 as previously stated. Each of these prime movers has reciprocatable pistons (a) protruding therefrom and through corresponding apertures in the base plate 40 for action against the underside 84 of the Z axis frame. Coil compression srping 85 bear a portion of the load by applying an upward force of approximately 10 lbs. The straight line mechanisms 44, 46, and 48 assure that over a limited distance of approximately 5 mm, the Z axis frame 34 moves in a direction parallel to the optical axis 24 (i.e. the Z axis) with a deviation of less than one μm.

FIG. 5 provides a cutaway view of the right straight line mechanism 46. The mechanism consists of a major arm portion 90 connected to a minor arm portion 92 and a third arm 94. The major and minor arms preferably form a unitary structure manufactured from a single piece of machine steel. The major arm preferably has a length of 214 mm while the minor arm has a preferred length of 107 mm. The major and minor arms are provided with reduced thickness portions 96, produced by milling, having a finished dimension of approximately ½ mm. These reduced thickness portions form flexible joints which have properties similar to rotational joints over small angles of flexure but which do not have the characteristic "play" of rotational joints. One end 98 of the minor arm 92 is connected to the base plate 40 by a Y axis directed screw 100. A free end 110 of the major arm is connected by a transversely directed screw 112 to the Z axis frame 34. The remaining end 114 of the major arm 90 is connected by screws (not shown) to the third arm 94. The third arm consists of a 48.75 mm length of stainless steel shim stock having a thickness of 0.020 inch. The shim stock is connected by screws to a dog leg 116 which is rigidly connected to the base plate 40.

The straight line mechanism 46 thus provides substantial resistance to motion of the Z axis frame 34 in the X-Y reference plane but permits the Z axis frame to move linearly, over small distances (i.e. less than 5 mm) in the Z axis direction. This is apparent in that the major and minor arms 90, 92 are substantially rigid in the X-Y direction but can flex at reduced thickness portion 96 in the Z axis direction. Furthermore, the third arm 94 is rigid in the Z axis and X axis directions but is flexible in the Y axis direction. However, due to its orientation transverse to the major and minor arms, the net result is that the free end 110 of the major arm 90 tends to move in a straight line along the Z axis within small distances.

The above result is explained with reference to FIG. 10 which is a free body diagram of the well known Scott Russell straight line mechanism. In this diagram, segment AE represents third arm 94, segment AC represents major arm 90 while segment BD represents minor arm 92. The circles and semi-circles shown in the free body diagram represent conventional rotational joints. The Z and X or Y axes are represented by vertical and horizontal axes. In the preferred embodiment shown in FIG. 5, the minor arm 92 has its non-free end 118 connected at a mid point 120 of the major arm 90. This is represented by point B in the free body diagram. Thus, the straight line mechanism 46 is an isosceles, modified flexible version of the Scott Russell straight line mechanism wherein the reduced thickness portions 96 represent rotating joints B, C and D and the third arm 94 provides flexible motion simulating rotating joints A and E. The lengths of the various segments satisfy the general equation AB=(BC+BD)/2 which can be solved for BC as: BC=(2AC−BD)/3. However, in this preferred embodiment AB=BC=BD producing the desired isosceles structure.

Figure 10:
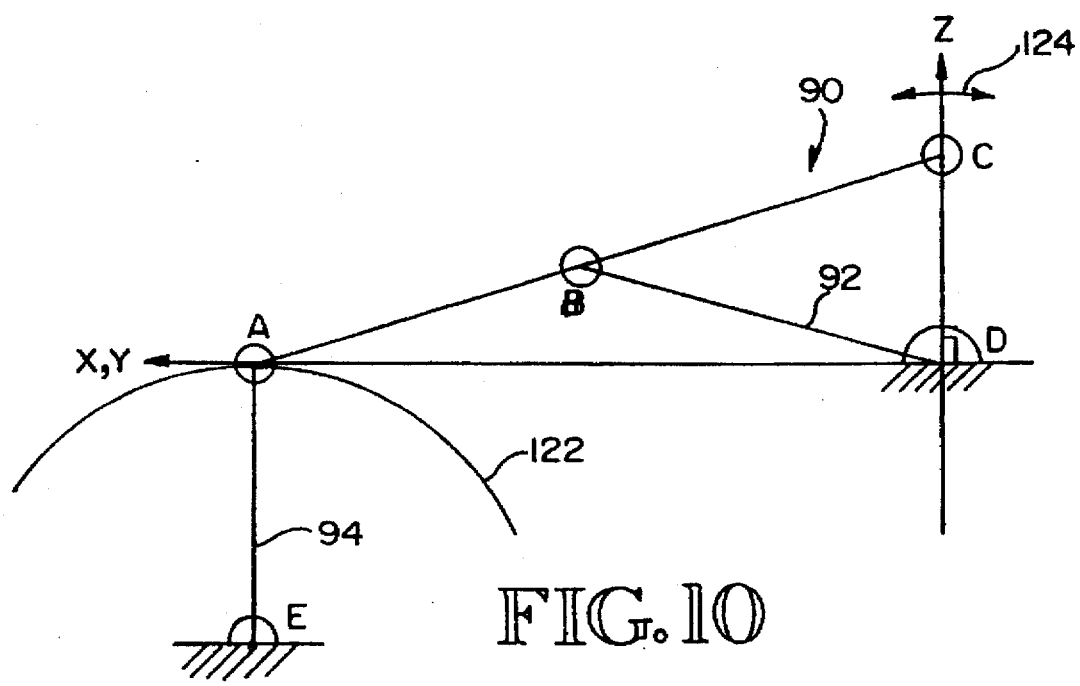
FIG. 10 is a free body diagram illustrating a Scott-Russell straight line mechanism.

Vertical motion can be visualized from the free body diagram of FIG. 10. Vertical movement of point C upwardly along the Z axis (representing vertical motion of the free end 110 of the major arm 90 in a vertical direction) causes point A (corresponding to the remaining end 114 of the major arm 90) to move along a circular path 122. However, for the dimensions of the arms given above, the lateral variation 124 of point C with respect to the Z axis is less than one micrometer considering that rotational joints A through E have been replaced by flexible joints approaching the play-free motion of an ideal rotating joint. As a result, the straight line mechanism 46 of FIG. 5, and left and rear straight line mechanisms 44, 48 permit pistons 50(a), 52(a), and 54(a) to move the Z axis frame 34 in a substantially vertical direction with respect to the base plate 40 while restricting motion in the X-Y reference plane to less than one micrometer.

Figure 4:
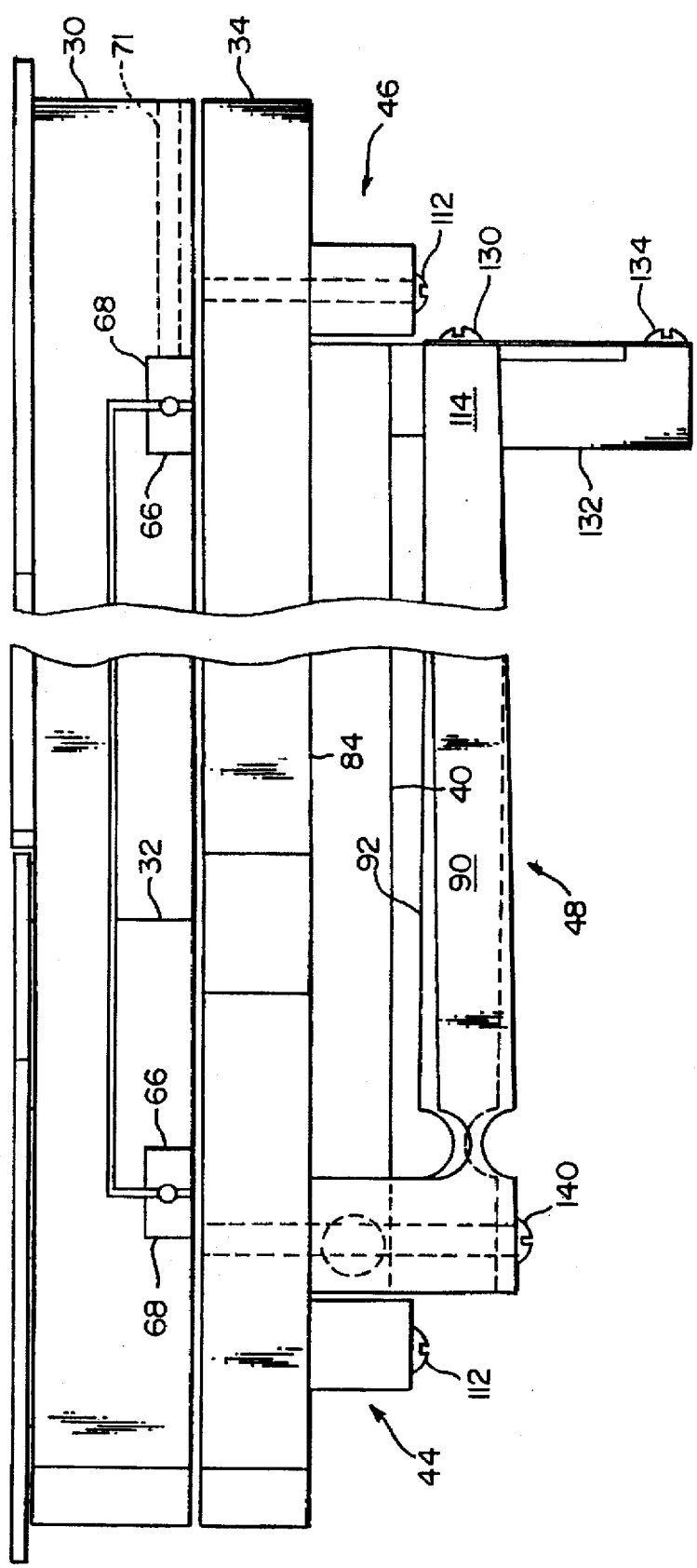
FIG. 4 is a partial, enlarged, front elevational view similar to FIG. 3.

FIG. 6 is a cutaway top plan view of the base plate 40 illustrating the manner of attachment and position of the rear straight line mechanism 48. As best seen in FIG. 8, the remaining end 114 of the major arm 90 is connected by screws 130 to the third arm 94. The third arm 94 is connected to a dog leg structure 132 similar to the dog leg 116 by screws 134. The dog leg is then rigidly connected, such as by a screw 135 to the base plate 40. With reference to FIG. 7, it is seen that the end 98 of the minor arm 92 is connected to the base plate 40 by a short screw 136 while the longer end 110 of the major arm 90 passes through a gap 138 in the base plate 40 to permit a longer screw 140 to connect the free end 110 to the Z axis frame 34. FIG. 4 shows a front elevational view further illustrating the placement of rear straight line mechanism 48.

Figure 1:
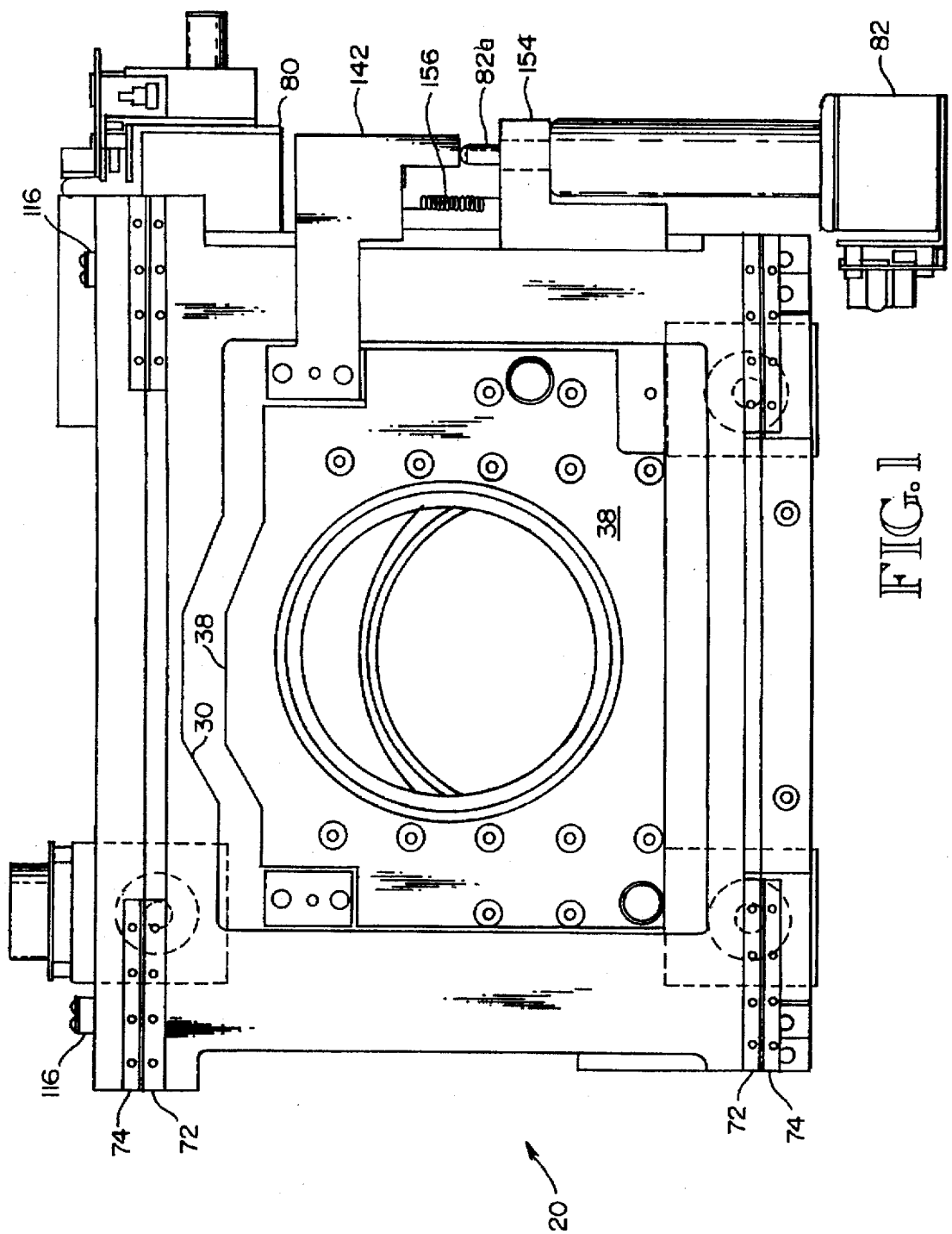
FIG. 1 is a top plan view of an orthogonal motion stage in accordance with the general principles of the invention.
Figure 3:
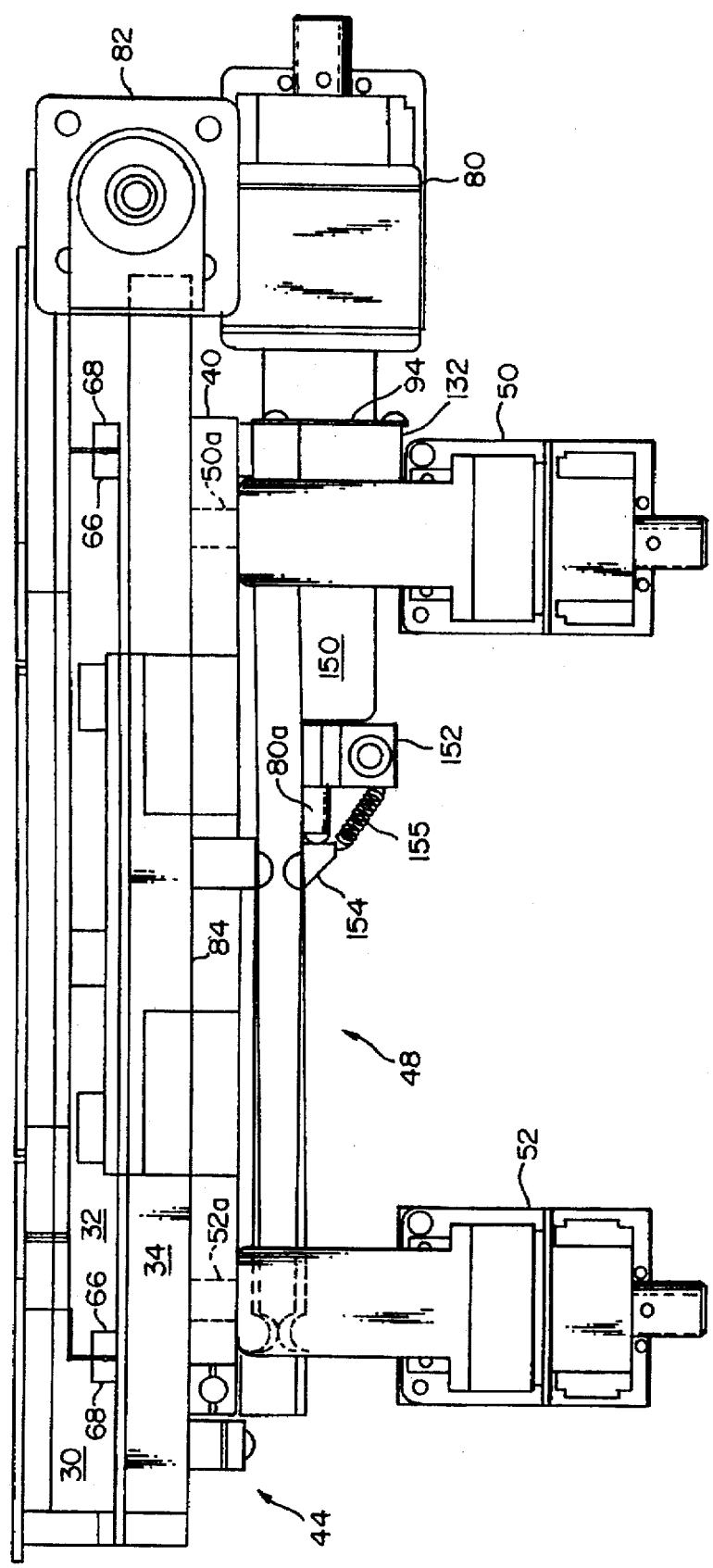
FIG. 3 is a front elevational view.

The X, Y prime movers 80, 82 in FIG. 2 are represented in exploded view. FIGS. 1 and 3 more accurately depict their actual placement with respect to the X axis frame 30 and Y axis frame 32. As seen in FIG. 3, the X axis prime mover 80 has its main body 150 connected to a downwardly depending projection 152 connected to the Z axis frame 34. The X axis prime mover 80 has a reciprocating piston protruding therefrom 80(a) which urges against a downwardly depending protrusion 154 which is in turn connected to the X axis frame 30. A coil-type tension spring 155 interconnects protrusions 154 and 142, to bias the X axis frame against the outward urging of piston 80(a). Sliding contact between the piston 80(a) and the protrusion 154 prevents translation of Z axis motion therebetween while the piston reciprocates.

In a similar fashion, as shown in FIGS. 1 and 2, the Y axis prime mover 82 is connected by a protrusion 154 to the X axis frame 30. A cooperative protrusion 142 passes through a gap 143 in the X axis frame 30 and is connected the Y axis frame 32 such as by screws (not shown). The protrusion 142 is positioned to abut the piston 82(a) of the Y axis prime mover 82. A coil tension spring 156 interconnects the protrusions and urges them together when the piston 82(a) retracts. All of the prime movers 50, 52, 54, 80, and 82 are available from Applied Precision, Inc., Mercer Island, Wash., U.S.A., under the trademark NANOMOVER™.

These NANOMOVER™ brand micro-positioning devices have on-board circuitry enabling computer control of the piston motion by way of conventional personal computer software interfaces which are commercially available. It is therefore possible for system designers to program the prime movers, to translate specimen carrier 38 along the three orthogonal axes defining the referenced frame 28 of FIG. 2 to describe a predetermined path and sequence. In this way, the microscope 22 can develop a three dimensional image of a sample contained in the specimen carrier.

Other variations and embodiments of the invention, consonant with the general principles described herein are contemplated. Therefore, the invention is not to be limited by the above disclosure, but is to be determined in scope by the claims which follow.

I claim:

1. An orthogonal motion stage, comprising:
   first and second carriers slidably interconnected for relative motion in a first direction and defining a horizontal motion assembly;
   a third carrier slidably connected to the horizontal motion assembly for linear motion in a second direction orthogonal to the first direction so as to define a reference plane;
   a base member connected by a straight line motion mechanism to the third carrier for motion of the third carrier in a third direction orthogonal to the reference plane;
   a specimen carrier;
   a flexible, mechanism flexibly interconnecting the specimen carrier with the horizontal motion assembly in the third direction, rigidly interconnecting the specimen carrier with the horizontal motion assembly in the first and second directions, and positioning the specimen carrier in contact with the third carrier for translation of the specimen carrier in the third direction and for slidable engagement with the third carrier in the first and second directions; and,
   moving means for moving the first, second and third carriers in their respective directions, whereby motion of the first and second carriers in the first and second directions does not induce undesirable motion of the specimen carrier in the third direction.

2. The stage of claim 1, wherein the straight line mechanism has first, second and third reaction arms for preventing motion of the third carrier in the first and second directions, the first arm having one end connected to the base member and an other end connected to the second arm, the second arm having one end connected to the third carrier and an other end connected to the third arm, the third arm having one end connected to the base member distant from the connection between the first arm and the base member.

3. The stage of claim 2, wherein the connections of the first and second arms to each other, to the third carrier and to the base member are rigid in the first and second directions and flexible in the third direction, and wherein the connection of the third arm to the second arm is rigid in the third direction and in one direction parallel to the reference frame and flexible in a remaining orthogonal direction.

4. The stage of claim 3, wherein the third arm has a length of up to 40 mm.

5. The stage of claim 4, wherein the first arm has a length of 107 mm, and the second arm has a length of 214 mm.

6. The stage of claim 3, wherein the second arm has a length twice that of the first arm and wherein the other end of the first arm is connected to a midpoint of the second arm.

7. The stage of claim 3, wherein the first arm is connected to the second arm at a point measured from the second arm's connection with the third carrier equal to one third of the difference between twice the length of the second arm and the length of the first arm.

8. The stage of claim 7, wherein the length of the first arm is equal to the distance between the point and the connection between the second arm and the third carrier.

9. The stage of claim 3, including a plurality of straight line mechanisms connecting the base member and the third carrier.

10. The stage of claim 2, including a plurality of straight line mechanisms connecting the base member and the third carrier.

11. An orthogonal motion stage, comprising:
    X axis and Y axis frames slidably interconnected for relative motion in an X axis direction and defining an X-Y assembly;
    a Z axis frame slidably connected to the X-Y assembly for linear motion in a Y axis direction orthogonal to the X axis direction so as to define a reference plane;
    a base member connected by a straight line motion mechanism to the Z axis frame for motion of the Z axis frame in a Z axis direction perpendicular to the reference plane;
    a specimen carrier:
    a flexible mechanism flexibly interconnecting the specimen carrier with the X-Y assembly in the Z axis direction, rigidly interconnecting the specimen carrier with the X-Y assembly in the X and Y axis directions, and positioning the specimen carrier in contact with the Z axis frame for translation in the Z axis direction and for slidable engagement with the Z axis frame in the X axis and Y axis directions; and,
    moving means for moving the X, Y and Z axis frames in their respective directions, whereby motion of the X and Y axis frames in the X and Y axis directions does not induce undesirable motion of the specimen carrier in the Z axis direction.

12. The stage of claim 11, wherein the straight line mechanism has first, second and third reaction arms for preventing motion of the Z axis frame in the X and Y axis directions, the first arm having one end connected to the base member and an other end connected to the second arm, the second arm having one end connected to the Z axis frame and an other end connected to the third arm, the third arm having one end connected to the base member distant from the connection between the first arm and the base member.

13. The stage of claim 12, wherein the connections of the first and second arms to each other, to the Z axis frame, and to the base member are rigid in directions parallel to the reference plane and flexible in the Z axis direction, and wherein the connection of the third arm to the second arm is rigid in the Z axis direction and in one direction parallel to the reference plane and flexible in a remaining orthogonal direction.

14. The stage of claim 13, wherein the third arm has a length of up to 40 mm.

15. The stage of claim 14, wherein the first arm has a length of 107 mm, and the second arm has a length of 214 mm.

16. The stage of claim 13, wherein the second arm has a length twice that of the first arm and wherein the other end of the first arm is connected to a midpoint of the second arm.

17. The stage of claim 13, wherein the first arm is connected to the second arm at a point measured from the second arm's connection with the Z axis frame equal to one third of the difference between twice the length of the second arm and the length of the first arm.

18. The stage of claim 17, wherein the length of the first arm is equal to the distance between the point and the connection between the second arm and the Z axis frame.

19. The stage of claim 13, including a plurality of straight line mechanisms connecting the base member and the Z axis frame.

20. A method for interconnecting X, Y and Z axis carriers with a specimen carrier in a stage, comprising the steps of:

slidably interconnecting X, Y and Z axis carriers for relative translational motion in X axis and Y axis directions so as to define an X-Y assembly;

rigidly connecting the Z axis carrier to a base member in the X and Y axis directions;

flexibly connecting the Z axis carrier to the base member in a Z axis direction; and, rigidly connecting a specimen carrier to the X-Y assembly in the X and Y axis directions, and flexibly in the Z axis direction, and transferring motion of the Z axis carrier to the specimen carrier by direct contact.

\* \* \* \* \*